US008244238B1

(12) United States Patent
Shkut et al.

(10) Patent No.: US 8,244,238 B1
(45) Date of Patent: Aug. 14, 2012

(54) DYNAMIC CONFIGURATION OF UNLIMITED SERVICE FOR ROAMING SUBSCRIBER

(75) Inventors: Michael Shkut, Marvin, NC (US);
Thomas J. Cieslak, Naperville, IL (US);
Nathaniel Robeson, Chicago, IL (US)

(73) Assignee: Cricket Communications, Inc., San Diego, CA (US)

( * ) Notice: Subject to any disclaimer, the term of this patent is extended or adjusted under 35 U.S.C. 154(b) by 497 days.

(21) Appl. No.: 12/422,102

(22) Filed: Apr. 10, 2009

Related U.S. Application Data

(60) Provisional application No. 61/044,367, filed on Apr. 11, 2008, provisional application No. 61/101,619, filed on Sep. 30, 2008.

(51) Int. Cl.
*H04W 4/00* (2009.01)
(52) U.S. Cl. ........................ 455/432.1; 455/406; 370/331
(58) Field of Classification Search .................. 455/433, 455/435.1, 436–439, 442, 406–408, 412.1–2, 455/432.1–3; 370/331, 332
See application file for complete search history.

(56) References Cited

U.S. PATENT DOCUMENTS

| 7,103,358 | B2 * | 9/2006 | Rodriguez et al. ......... 455/432.3 |
| 7,966,013 | B2 * | 6/2011 | D'Souza et al. ........... 455/432.1 |
| 2003/0134650 | A1 * | 7/2003 | Sundar et al. ................. 455/465 |
| 2004/0235455 | A1 * | 11/2004 | Jiang ............................ 455/411 |
| 2006/0004643 | A1 * | 1/2006 | Stadelmann et al. .......... 705/34 |
| 2008/0125116 | A1 * | 5/2008 | Jiang ............................ 455/433 |
| 2008/0194232 | A1 * | 8/2008 | Muratore et al. ............. 455/411 |
| 2010/0128685 | A1 * | 5/2010 | Jiang ........................... 370/329 |

* cited by examiner

*Primary Examiner* — Cong Tran
(74) *Attorney, Agent, or Firm* — Knobbe Martens Olsen & Bear LLP (57) ABSTRACT

Methods, systems, and apparatus are presented for enabling unlimited roaming service on a roaming partner switch. In one aspect, a method includes configuring a billing system corresponding to a home wireless service provider to authorize a subscriber device to receive unlimited roaming service on a roaming partner switch; receiving, by the home wireless service provider, a registration request from the roaming partner switch identifying the subscriber device; registering the subscriber device in the billing system as an unlimited roaming service subscriber device; and providing unlimited roaming service to the subscriber device. Further, a call request associated with the subscriber device can be received from the roaming partner switch and billing associated with the call request can be suspended.

22 Claims, 7 Drawing Sheets

DYNAMIC CONFIGURATION OF UNLIMITED SERVICE FOR ROAMING SUBSCRIBER

CROSS-REFERENCE TO RELATED APPLICATIONS

This application claims priority to U.S. Provisional Application Ser. No. 61/044,367 filed Apr. 11, 2008, entitled "System and Method for Single Stage Dialing While Roaming" and to U.S. Provisional Application Ser. No. 61/101,619 filed Sep. 30, 2008, entitled "Dynamic Configuration of Unlimited Service for Roaming Subscriber," and the entire disclosure of each is incorporated herein by reference.

TECHNICAL FIELD

The present disclosure relates to telecommunications systems, e.g., to systems and methods for dynamically configuring a wireless communications system to provide unlimited service to one or more roaming subscribers.

BACKGROUND

A wireless communications provider can implement one or more home service areas in which the wireless communications provider communicates directly with one or more wireless communication devices (also referred to as mobile devices or mobile handsets). Subscribers (or subscriber devices) receive service directly from the wireless communications provider when they are within the footprint of any of the home service areas. For example, a wireless communications provider can implement a service area encompassing San Diego, Calif. Subscribers of the wireless communications provider thus can be considered to be on the home network when located within the San Diego service area.

A subscriber who is located outside of a home service area is generally referred to as roaming. The wireless communications provider can cooperate with one or more third-party service providers to permit its subscribers to access wireless communications services when they are roaming. For example, the wireless communications provider can establish service agreements with one or more third-party service providers (or roaming partners), including reciprocal service agreements. Typically, a roaming subscriber is charged additional fees in exchange for accessing wireless communications service through a third-party service provider, such as connection charges and additional air-time fees. Further, one or more services available to a subscriber through the home network may not be available to the subscriber when roaming, such as access to account information.

In order to access wireless communications services, such as placing outgoing telephone calls, receiving incoming telephone calls, and transmitting/receiving electronic messages, a roaming subscriber must register with the third-party service provider operating the network in which the subscriber is roaming. One or more details regarding the roaming subscriber can be written into a Visitor Location Register (VLR) maintained by the third-party service provider, such as when the roaming subscriber enters the third-party service area. The information stored in the VLR can be collected through messaging with the Home Location Register (HLR) corresponding to the subscriber. Further, the messaging can be performed in accordance with an established messaging protocol, such as SS7. For example, the VLR can store the subscriber's identity, such as from a subscriber identity module, authentication data, the subscriber's telephone number, and the address of the HLR corresponding to the subscriber. The VLR can then communicate with the HLR to determine whether and what types of service can be provided to the roaming subscriber. Once the roaming subscriber leaves a particular service area, the information associated with the roaming subscriber can be deleted from the VLR.

SUMMARY

A telecommunications system, such as a system associated with a home wireless service provider having one or more subscribers, can be dynamically configured to provide unlimited service to one or more of its subscribers who are roaming (roaming subscribers). The unlimited service can encompass any services the subscriber is configured to receive, including voice, text, and/or data service. Further, the dynamic configuration can be performed such that all settings necessary to provide unlimited service to a roaming subscriber can be initialized in devices resident on the home wireless service provider's network. Thus, no involvement by a third-party, such as a roaming partner, is required beyond the initial configuration of standard roaming services. The dynamic configuration also can be performed such that any changes to the home wireless service provider's systems to implement unlimited service are transparent to the one or more associated roaming partners. In order to permit dynamic configuration of unlimited service for roaming subscribers, the present inventors recognized that unlimited service can be enabled on a per switch basis.

The present inventors also recognized a need for providing unlimited service on a roaming partner switch only temporarily, such as in conjunction with a special event. For example, unlimited service can be provided via one or more roaming partner switches during a holiday, in conjunction with a sporting event, in response to a natural disaster, in the case of a home network outage, or other such events. Further, the present inventors recognized a need to provide unlimited service to a roaming subscriber such that the customer experience is indistinguishable from service in a home service area, including providing the same access to services and features. Also, the present inventors recognized a need to provide to roaming subscribers only those services to which the subscriber has access when in a home service area. Additionally, the present inventors recognized that the decision to provide unlimited service to a roaming subscriber can be made at the time the roaming subscriber registers with a VLR.

The present inventors also recognized a need to provide unlimited service to roaming subscribers through multiple roaming partner switches, such as to cover a particular geographic region. Thus, multiple roaming partner switches within a particular geographic region can be identified for the provision of unlimited service to roaming subscribers. Further, the present inventors recognized a need to provide unlimited services only to certain roaming subscribers within a particular geographic region. Additionally, the present inventors recognized a need to permit turning off unlimited service for roaming subscribers on a per switch basis and doing so independently, such that the involvement of a third-party is not required. Accordingly, the techniques and apparatus described here implement algorithms for dynamically configuring a wireless telecommunications system to provide unlimited service to one or more roaming subscribers.

In general, in one aspect, the techniques can be implemented to include configuring a billing system corresponding to a home wireless service provider to authorize a subscriber device to receive unlimited roaming service on a roaming partner switch; receiving, by the home wireless service provider, a registration request from the roaming partner switch identifying the subscriber device; registering the subscriber device in the billing system as an unlimited roaming service subscriber device; and providing unlimited roaming service to the subscriber device.

The techniques also can be implemented to include registering the subscriber device as a home subscriber device in a home location register associated with the home wireless service provider. Further, the techniques can be implemented such that registering the subscriber device as a home subscriber device further comprises determining that a home region parameter associated with the subscriber device corresponds to a geographic location of the roaming partner switch. Additionally, the techniques can be implemented to include notifying the billing system, by the home location register, that the subscriber device has been registered as a home subscriber device.

The techniques also can be implemented to include receiving from the roaming partner switch a call request associated with the subscriber device and suspending billing associated with the call request. Further, the techniques can be implemented such that suspending billing further comprises suppressing a pre-call announcement associated with standard roaming service. Additionally, the techniques can be implemented such that suspending billing further comprises suspending an account balance verification.

The techniques also can be implemented to include receiving a registration request from the roaming partner switch identifying a second subscriber device associated with the home wireless service provider; determining, based on the billing system configuration, that the second subscriber device is not authorized to receive unlimited roaming service on the roaming partner switch; and providing standard roaming service to the second subscriber device. Further, the techniques can be implemented such that registering the subscriber device in the billing system is performed in real-time. Also, the techniques can be implemented to include restricting the unlimited roaming service provided to the subscriber device to a subscribed level of service. Additionally, the techniques can be implemented such that the subscribed level of service includes unlimited voice service.

In general, in another aspect, the techniques can be implemented as a system including a home wireless service provider that includes a billing system and a home location register; a roaming partner switch communicatively coupled to the home wireless service provider; and a subscriber device associated with the home wireless service provider; wherein the home wireless service provider includes processor electronics configured to perform operations including authorizing, in the billing system, the subscriber device to receive unlimited roaming service on the roaming partner switch; registering, in response to receiving a registration request identifying the subscriber device from the roaming partner switch, the subscriber device in the home location register as a home subscriber device and in the billing system as an unlimited roaming service subscriber device; and enabling the provision of unlimited roaming service to the subscriber device.

The techniques also can be implemented such that the home location register is configured to perform operations including determining that a home region parameter associated with the subscriber device corresponds to a geographic location of the roaming partner switch. Further, the techniques can be implemented such that the home location register is configured to perform operations including transmitting a message to the billing system, indicating that the subscriber device has been registered as a home subscriber device. Additionally, the techniques can be implemented such that the processor electronics are further configured to perform operations including receiving a registration request from the roaming partner switch identifying a second subscriber device associated with the home wireless service provider; determining, based on the billing system configuration, that the second subscriber device is not authorized to receive unlimited roaming service on the roaming partner switch; and providing standard roaming service to the second subscriber device.

The techniques also can be implemented such that the processor electronics are further configured to perform operations including receiving from the roaming partner switch a call request associated with the subscriber device and suspending billing associated with the call request. Further, the techniques can be implemented such that the processor electronics are further configured to perform operations including suppressing a pre-call announcement associated with standard roaming service. Additionally, the techniques can be implemented such that the processor electronics are further configured to perform operations including suspending an account balance verification.

The techniques also can be implemented such that the processor electronics are further configured to perform operations including registering the subscriber device in the billing system in real-time. Further, the techniques can be implemented such that the processor electronics are further configured to perform operations including restricting the unlimited roaming service enabled for the subscriber device to a subscribed level of service. Additionally, the techniques can be implemented such that the subscribed level of service includes unlimited voice service.

In general, in another aspect, the techniques can be implemented to include receiving, by a home wireless service provider, a registration request from a roaming partner switch identifying a subscriber device; registering, by a home location register associated with the home wireless service provider, the subscriber device as a home subscriber device based on one or more subscriber values; determining, by a billing system associated with the home wireless service provider, that the subscriber device is eligible to receive unlimited roaming service based at least in part on the subscriber device being registered as a home subscriber device; and providing unlimited roaming service to the subscriber device.

The techniques described in this specification can be implemented to realize one or more of the following potential advantages. For example, the techniques can be implemented such that a subscriber can be provided with unlimited service even when the subscriber is roaming outside of the home wireless service provider's coverage area (or home network). The techniques also can be implemented such that unlimited service can be provided through a roaming partner switch without requiring the roaming partner to implement any changes once standard roaming service has been configured, such as changes to switch settings. Additionally, the techniques can be implemented to permit providing unlimited service for roaming subscribers in a manner that is transparent to both the subscriber and the roaming partner. The techniques also can be implemented to provide unlimited service in a home service area, such as when at least a portion of the infrastructure associated with the home service area is unavailable or otherwise rendered inoperable. For example, unlimited service can be provided if any portion of the infrastructure is unavailable as a result of equipment failure, natural disaster, or planned maintenance.

The techniques also can be implemented such that a subscriber can receive the same level of mobile communications services in both home service areas and when roaming. The techniques further can be implemented to include separately determining whether to provide unlimited service for each roaming subscriber who registers with a roaming partner switch. Also, the techniques can be implemented to establish a virtual home service area for a geographic region in which the home wireless service provider has limited or no infrastructure. Further, the techniques can be implemented to include providing unlimited service through multiple roaming partner switches located in an at least partially overlapping geographic region. Additionally, the techniques can be implemented to permit a home wireless service provider to independently establish unlimited service for its roaming subscribers in one or more geographic regions for a predetermined event, special occurrence, advertising promotion, or other such event.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
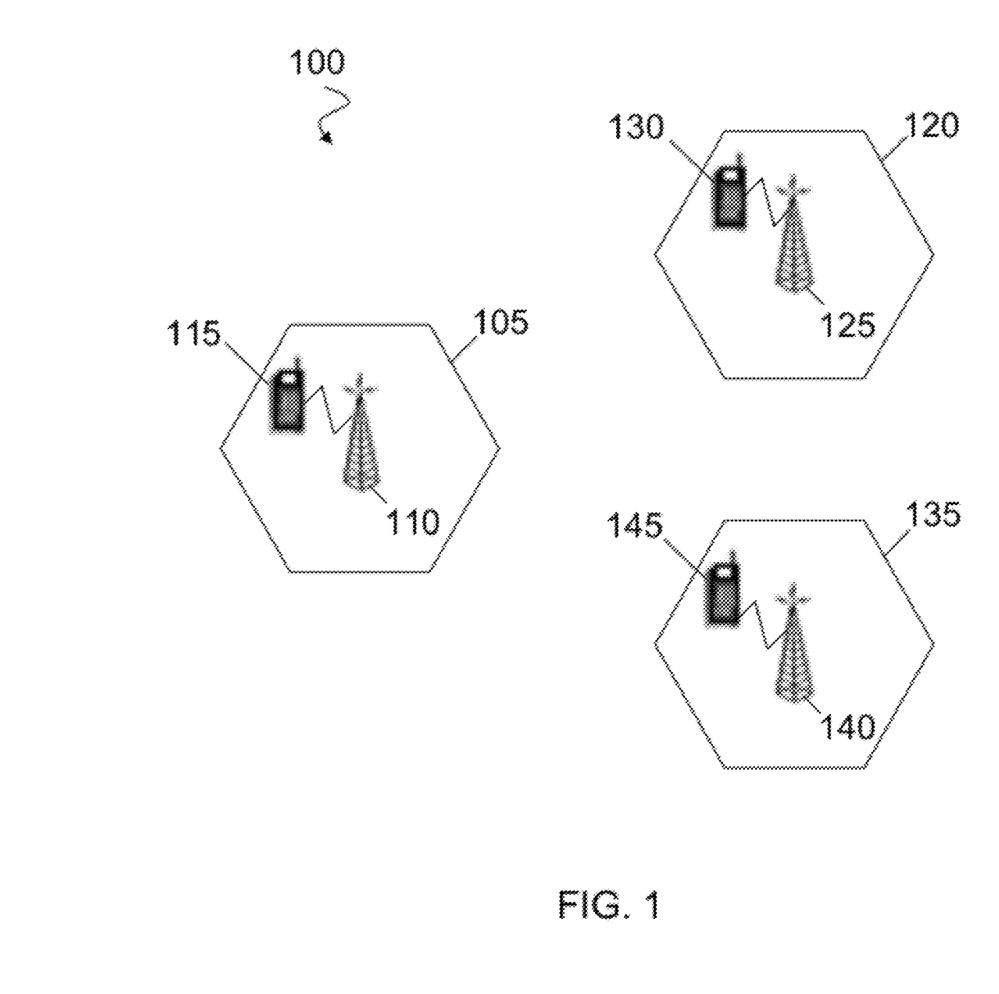
FIG. 1 shows an example of a telecommunications system that includes a home service area associated with a wireless communications provider and multiple roaming service areas.

FIG. 1 shows an example of a telecommunications system 100 that includes a home service area 105 associated with a home wireless service provider and multiple roaming service areas. The home service area 105 includes wireless communications infrastructure 110 managed by the home wireless service provider. Further, a mobile device 115 registered with the home wireless service provider can be operated in the home service area 105. For example, the mobile device 115 can belong to a subscriber who has an account with the home wireless service provider. Inside of the home service area 105, the mobile device 115 can be used to access all of the features and services associated with the subscriber's account. For example, the subscriber's account can include unlimited incoming and outgoing local calls, unlimited text, unlimited data, access to provider-sponsored directory assistance, and provider-based services, such as account management and customer service. Further, the subscriber can be required to pay toll charges for outgoing long distance calls placed from inside of the home service area 105, but not for air time associated with such calls. In some implementations, the home wireless service provider can operate a plurality of home service areas.

The telecommunications system 100 also can include a first roaming service area 120 associated with a first roaming partner. A roaming partner can be any service provider who will route service requests placed by roaming subscribers to their home wireless service provider (or home network). The first roaming service area 120 can include wireless communications infrastructure 125 managed by the first roaming partner. A mobile device 130 associated with a roaming subscriber, such as a subscriber registered with the home wireless service provider, can be operated in the first roaming service area 120. The first roaming service area 120 can be configured as a conventional roaming area, in which the roaming subscriber has limited or no access to one or more of the features and services associated with the subscriber's account that are accessible when the subscriber is located in a home service area, such as the home service area 105. Also, the roaming subscriber can be required to pay additional fees, such as data charges and air time charges for any outgoing calls placed and incoming calls received while in the first roaming service area 120.

Additionally, the telecommunications system 100 can include a second roaming service area 135 associated with a second roaming partner. In some implementations, the first roaming service area 120 and the second roaming service area 135 can be associated with the same roaming partner. The second roaming service area 135 can include wireless communications infrastructure 140 managed by the second roaming partner. A mobile device 145 associated with a roaming subscriber, such as a subscriber registered with the home wireless service provider, can be operated in the second roaming service area 135.

The second roaming service area 135 can be configured as an unlimited roaming area, which can provide a roaming subscriber with a similar or identical customer experience to that provided in a home service area, such as the home service area 105. For example, a roaming subscriber in an unlimited roaming area can be permitted to make unlimited incoming and outgoing local calls, transmit and receive unlimited text and data, access provider-sponsored directory assistance, and utilize provider-based services, such as account management and customer service. Further, pre-call announcements and messages typically presented to a subscriber accessing service in a roaming area can be suppressed in an unlimited roaming area. Verification measures implemented to authorize service in roaming areas, such as account balance inquiries, also can be suspended for a subscriber accessing service in an unlimited roaming area. Additionally, the presentation of one or more roaming indicators, such as a visual indicator displayed on the screen of a mobile device, can be turned off in an unlimited roaming area. For example, the display of the mobile device 145 will be identical in both the second roaming service area 135 and the home service area 105. Thus, an unlimited roaming area can be made to appear as though it is part of the home wireless service provider's home network to at least some subscribers.

Figure 2:
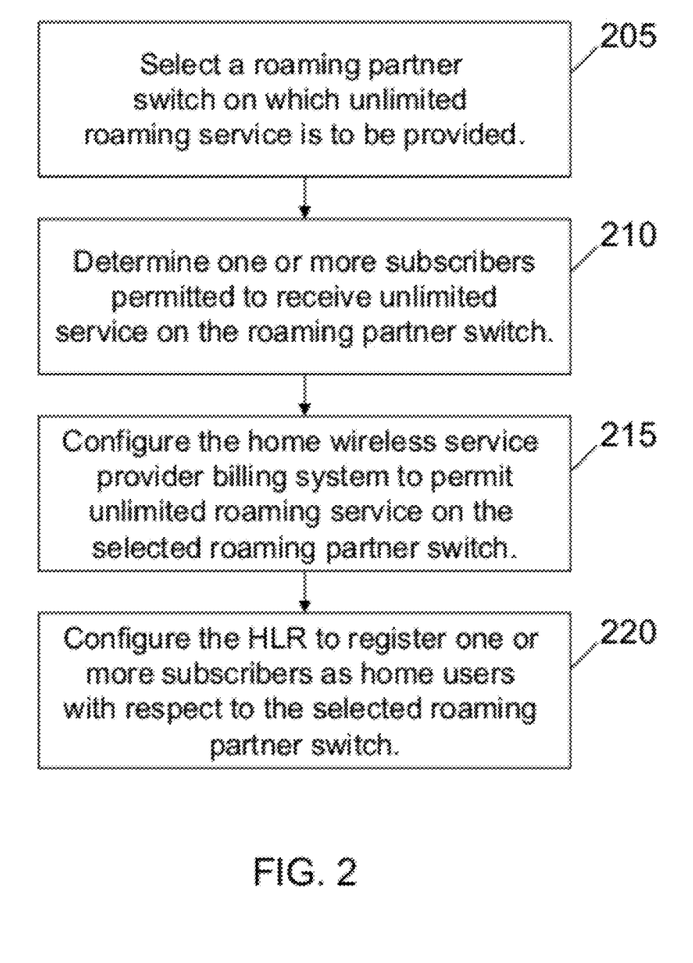
FIG. 2 shows an exemplary flowchart for configuring a system to provide unlimited roaming service on a roaming partner switch.

FIG. 2 shows an exemplary flowchart for configuring a system to provide unlimited roaming service on a roaming partner switch. The configuration process can be performed solely by the home wireless service provider, once standard roaming service has been enabled on the roaming partner switch. Thus, unlimited roaming service can be implemented on a roaming partner switch without necessitating any configuration changes by the roaming partner. Because no configuration changes to the roaming partner's infrastructure are required, unlimited roaming service can be implemented such that it is transparent to the corresponding roaming partner. Additionally, unlimited roaming service can be turn on and off in real-time, and does not require any configuration changes to be propagated to other systems or devices.

A roaming partner switch on which unlimited roaming service is to be provided can be selected (205). A unique switch identifier corresponding to each selected roaming partner switch can be identified. In some implementations, a roaming partner switch can be selected in response to a desire to provide unlimited roaming service in a particular geographic area, such as a local, regional, or national area. For example, in order to provide unlimited roaming services in the Kingman, Ariz. area, the home wireless service provider can select one or more switches in the Kingman area that are operated by one or more roaming partners. In some other implementations, a roaming partner switch can be selected in response to a business relationship, such as a partnership between the home wireless service provider and the corresponding roaming partner. For example, each of the switches operated by a particular roaming partner can be selected for unlimited roaming service.

One or more subscribers permitted to receive unlimited roaming service on the selected roaming partner switch can be determined (210). In some implementations, all subscribers can by default be permitted to receive unlimited roaming services on a roaming partner switch. In some other implementations, it can be determined that only particular subscribers are to receive unlimited roaming service on a particular roaming partner switch. For example, subscribers whose home market coincides with the roaming partner switch can be permitted to receive unlimited roaming services, while subscribers associated with other home markets can receive standard roaming service. Subscribers can be distinguished based on any number of criteria for which data is available to the home wireless service provider, including service plan, billing plan, and home market.

The billing system can be configured to permit unlimited roaming service on the selected roaming partner switch (215). The home wireless service provider's billing system can be used to control which roaming partner switches can be used to provide unlimited roaming service. For example, a database hosting information about a plurality of switches, including roaming partner switches, can be accessible to the billing system. The database can be local to the billing system or can be accessible at a remote location via a communications connection. Further, each switch can be described by a unique switch identifier, such as a mobile switching center identification number (MSCID). Thus, the record corresponding to the selected roaming partner switch can be accessed in the database and an attribute value, such as an unlimited roaming service identifier, can be set to indicate that unlimited roaming service is permitted on the selected roaming partner switch. For example, the unlimited roaming service identifier can be set to yes or no. In some implementations, if the selected roaming partner switch is not technically compatible with the provision of unlimited roaming service, the unlimited roaming service identifier can be set to "no" and locked to prevent change. Further, in some implementations, the unlimited roaming service identifier can be implemented using a graphical widget, such as a checkbox, to permit unlimited roaming service to be enabled or disabled with respect to a particular roaming partner switch in a single operation, such as a mouse click.

Additionally, the HLR can be configured to permit one or more subscribers to register as home users with respect to the selected roaming partner switch (220). The HLR can control the type of registration for a subscriber, such as by classifying the registration as "home" or "roam." A subscriber registered as home can receive unlimited roaming service, while a subscriber registered as roam is provided with standard roaming service. In some implementations, the decision to classify a subscriber as home or roam can be made based on a home region parameter setting associated with the roaming partner switch. For example, an MSC Definition File (MDF) can include one or more home region parameters that are allocated as home regions for the roaming partner switch. Further, a home region parameter in the MDF can be modified to indicate that subscribers of the home wireless service provider who are roaming on that roaming partner switch are to be registered as home users and thus provided with unlimited roaming service for the duration of the registration.

The HLR also can determine whether to classify a subscriber as home or roam based on one or more subscriber level values. In some implementations, the home region parameter associated with a subscriber can be accessed to determine whether the subscriber's home market coincides with that of the roaming partner switch on which the subscriber is being registered. For example, the HLR can be configured to register a roaming subscriber as home only if they are within a geographic area that corresponds to their home market. One or more other parameters associated with the subscriber also can be used in making the home or roam classification, including the subscriber's service plan and the subscriber's billing plan.

Figure 3:
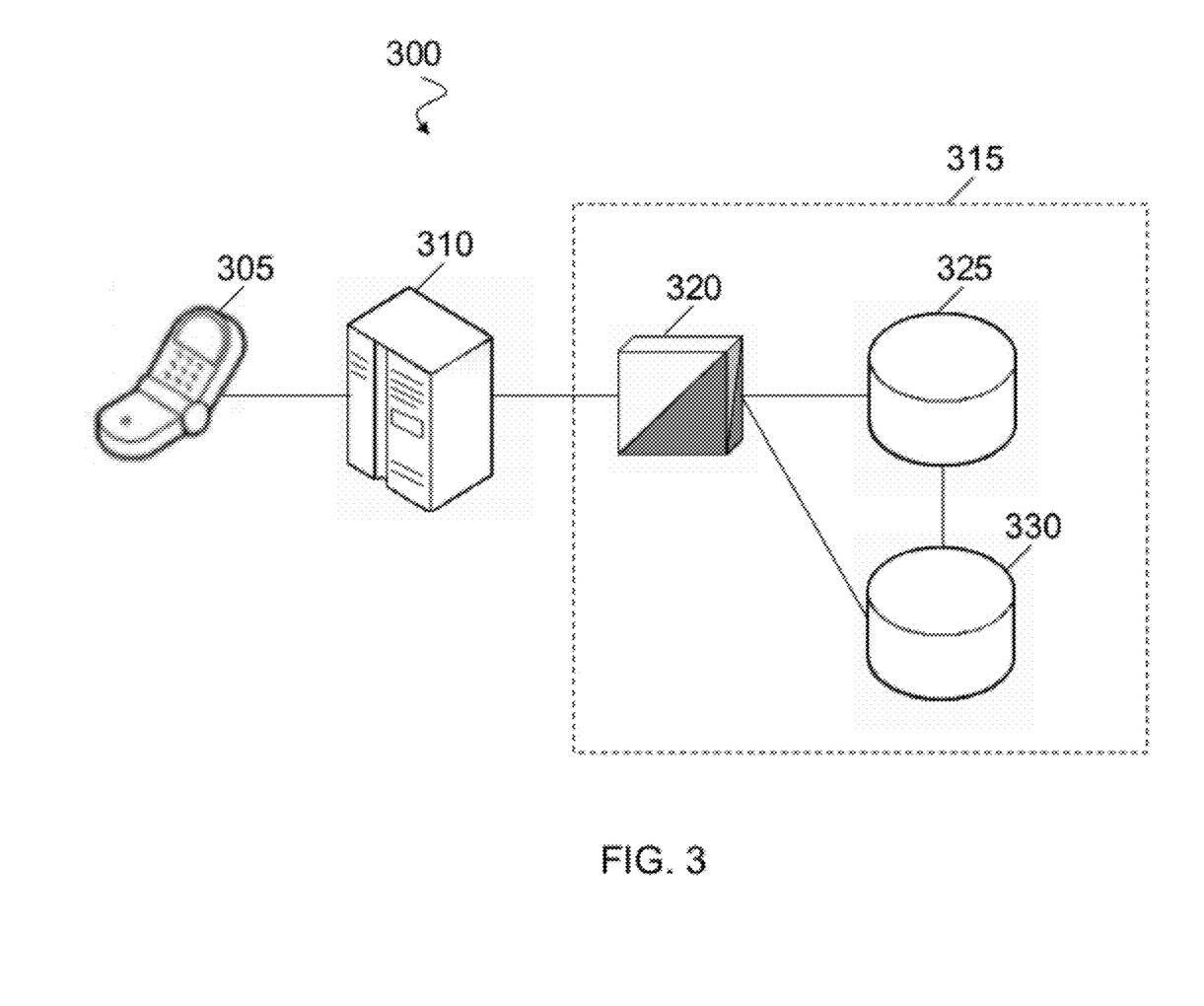
FIG. 3 shows an exemplary telecommunications system configured to enable providing unlimited roaming service to a roaming subscriber.

FIG. 3 shows an exemplary telecommunications system 300 configured to enable providing unlimited roaming service to a roaming subscriber. The telecommunications system 300 includes at least one mobile device 305, such as a mobile telephone, smart phone, or personal digital assistant. The mobile device 305 can have an account, such as a prepaid service account, on a home network 315 operated by a home wireless service provider. The telecommunications system 300 also can include a switch 310 associated with a roaming partner. The mobile device 305 does not have an account with the roaming partner that operates the switch 310. Thus, the mobile device 305 is roaming in the coverage area associated with the switch 310. Further, the mobile device 305 communicates with the switch 310 wirelessly, such as through radio frequency transmissions.

The home network 315 included in the telecommunications system 300 can have a Signal Transfer Point (STP) 320 that is configured to route one or more messages. For example, the STP 320 and the switch 310 can communicate with one another over a wireless or wired communication link through signaling. The STP can be implemented using a commercially available router, such as the Tekelec Eagle 5 Integrated Signaling System. In some implementations, the SS7 signaling protocol can be used for communications between the STP 320 and the switch 310. The home network 315 also can include a billing system 325, which can be used to store information regarding one or more subscriber accounts and one or more switches. For example, the billing system 325 can include information indicating the call activity, account balance, service plan, including text and/or data service, and available services corresponding to a subscriber account. Further, the billing system 325 can host or otherwise provide access to a database that stores information describing one or more switches, including information indicating whether a switch can be used to provide unlimited roaming service to roaming subscribers.

The billing system 325 can be implemented using a single computing platform or using a virtual device that includes multiple computing platforms. Further, the billing system 325 can include one or more internal storage devices and/or external storage devices. In some implementations, the portion of the billing system 325 that performs management of roaming subscribers and calls can be replaced by a separate system. In such implementations, the billing functions can be implemented in a separate billing system.

Additionally, the home network 315 included in the telecommunications system 300 can have an HLR 330, which can be configured to store data associated with each of the subscribers authorized to access the home network 315. For example, the HLR can store information characterizing the registration of a roaming subscriber on a roaming partner switch. The HLR 330 can be implemented using a single computing platform or using a virtual device that includes multiple computing platforms. Further, the HLR 330 can include internal storage devices and/or external storage devices. Additionally, the HLR can incorporate a learned routing functionality, such that the HLR can determine that its relationship with a roaming partner is managed through the billing system included in the HLR's network. Based on the learned routing function, the HLR can automatically modify its routing of subsequent messages. For example, the HLR can learn routing by monitoring the addresses of messages received from the billing system, including the MSCID and billing system point code. The STP 320, billing system 325, and HLR 330 included in the home network 315 can be configured to communicate with one another directly and/or indirectly through the exchange of one or more messages. The home network 315 further can include additional equipment and data necessary to provide telecommunication services.

Figure 4:
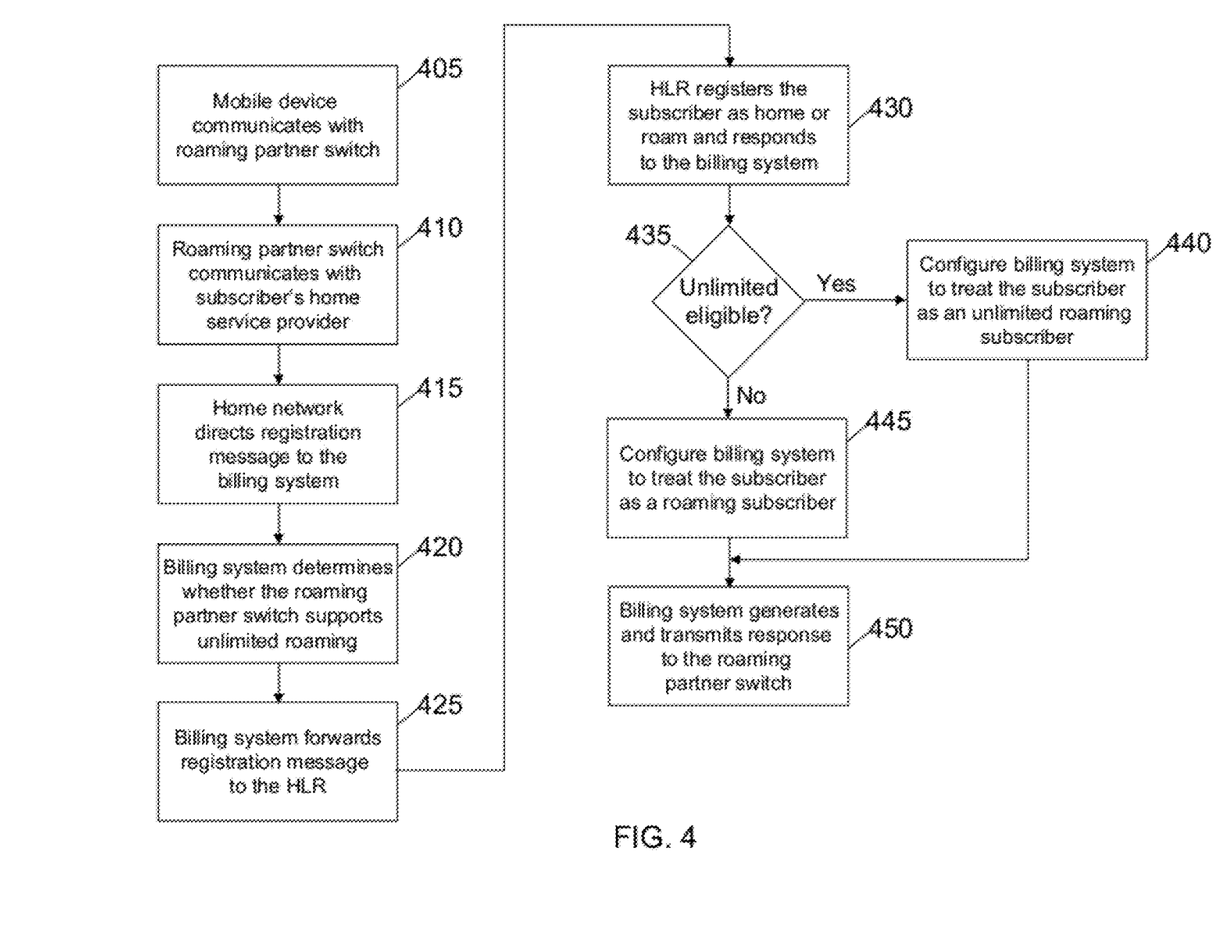
FIG. 4 shows an exemplary flowchart for registering a mobile device corresponding to a roaming subscriber on a roaming partner switch.

When the mobile device 305 roams into the coverage area served by the switch 310, the switch 310 can communicate with the home network 315 to determine whether service can be provided to the mobile device 305. FIG. 4 shows an exemplary flowchart for registering a mobile device corresponding to a roaming subscriber on a roaming partner switch. The registration process can be implemented without requiring the roaming partner to change any settings on their own network equipment once standard roaming services have been configured. For example, the roaming partner can continue to address to the HLR any message traffic corresponding to the roaming subscriber. The modifications to message routing can be performed solely on the home network equipment operated by the home wireless service provider, such as the STP, HLR, and billing system. Thus, unlimited roaming service can be provided in a roaming partner coverage area without the roaming partner being required to change any equipment settings or make any configuration changes. Further, determining whether to provide a roaming subscriber with unlimited roaming service can be performed without adding additional switching resources to the home network.

A mobile device associated with a subscriber can enter a geographic region (or coverage area) in which service is available only through a provider with which the subscriber does not have an account. The mobile device can be powered on when it enters the roaming region or subsequent to entering the roaming region. Once outside of its home service area, the mobile device can be operated in a roaming mode. The mobile device can communicate with a switch serving the geographic region, which can be operated by a roaming partner of the home wireless service provider (405). For example, the mobile device can provide one or more items of information to the roaming partner switch during registration, including a mobile identity number (MIN) and an electronic serial number (ESN).

The roaming partner switch can communicate with the mobile device subscriber's home service provider (410). For example, the roaming partner switch can generate a registration invoke (REGNOT) to the subscriber's home network HLR, requesting approval to provide service to the mobile device. The REGNOT can include one or more items of information that can be used to validate the mobile device, including the MIN and ESN. The REGNOT also can include one or more items of information associated with the roaming partner switch, including the mobile switching center identification number (MSCID), the point code of the roaming partner switch, and information describing one or more capabilities of the switch. Further, the REGNOT can include a Transaction Capabilities Application Part (TCAP) transaction identifier, which can be used to identify a subsequent response to the request received by the roaming partner switch.

The REGNOT transmitted by the roaming partner switch can be received by the home network and directed to a billing system (415). The home network STP can examine the REGNOT to determine whether it was received from a roaming partner. For example, the STP can access the originating point code included in the REGNOT and determine whether the point code corresponds to a roaming partner switch. Further, the STP can forward the REGNOT to the billing system. For example, the STP can implement a form of Method Transfer Protocol (MTP) Origination Based Routing, which routes messages at least partially based on an address corresponding to the originating device. The REGNOT further can be routed to the billing system without altering the message content or addressing information. For example, the STP can route the REGNOT to the billing system over a physical link.

The billing system can determine whether the roaming partner switch from which the REGNOT was received supports providing unlimited roaming service (420). For example, the billing system can be configured to access a database that includes information about a plurality of switches, including roaming partner switches. The switches can be uniquely identified in the database, such as by the MSCID. The database can be stored local to the billing system or can be accessible on a remote system via a communications connection. A record corresponding to the roaming partner switch can be accessed and an attribute value, such as an unlimited roaming service identifier, can be retrieved to determine whether the roaming partner switch supports providing unlimited roaming service. Further, unless locked, the attribute value can be changed to enable providing unlimited roaming service through the corresponding switch.

The billing system also can forward the REGNOT to the HLR (425). The billing system can alter the addressing information of the REGNOT to simulate a REGNOT message transmitted to the HLR from the billing system. The billing system also can generate a new TCAP transaction identifier for the REGNOT. The HLR can register the subscriber as home or roam, and can respond to the billing system (430). The HLR can evaluate one or more criteria in determining how to register the subscriber with respect to the roaming partner switch. For example, the HLR can determine whether to register a subscriber as home or roam based on a home region parameter setting associated with the roaming partner switch, such as a home region parameter specified in the MDF corresponding to the roaming partner switch.

The HLR also can determine whether to classify a subscriber as home or roam based on one or more subscriber-level values. For example, the subscriber's home region parameter can be accessed to determine whether the subscriber's home market coincides with that of the roaming partner switch on which the subscriber is being registered. One or more other parameters associated with the subscriber also can be used in making the home or roam classification, including the subscriber's service plan and the subscriber's billing plan.

Further, the HLR can respond to the billing system to identify how the subscriber is registered. For example, the HLR can transmit a reply message to the billing system, such as a registration return result message, that includes an origination indicator value corresponding to a specific type of registration. In some implementations, if the HLR registers the subscriber as a roaming subscriber (or roam), the reply message can include an origination indicator value equal to 8. The reply message also can include an associated toll free number, such as an 800 number, to which calls placed by the roaming subscriber are to be routed. The billing system can be configured to interpret these characteristics to determine that the subscriber is to be treated as a roaming subscriber and should be charged on a roaming basis for incoming and outgoing calls routed through the roaming partner switch.

Alternatively, if the HLR registers the subscriber as a home subscriber, the reply message can include an origination indicator with a value that is not equal to 8. The assigned origination indicator value further can identify a predetermined level of service. For example, an origination indicator equal to 6 can indicate that the subscriber's service plan does not include domestic long distance, an origination indicator equal to 13 can indicate that the subscriber's service plan includes unlimited domestic long distance, and an origination indicator equal to 23 can indicate that the subscriber's service plan includes unlimited domestic long distance and unlimited directory assistance. Thus, the HLR notifies the billing system of the level of service corresponding to the roaming subscriber. The origination indicators are provided as examples. Different meanings can be assigned to the origination indicator values in other implementations and different indicators can be used in the reply message.

The billing system can then determine whether the subscriber is eligible to receive unlimited roaming service (435). The billing system can determine whether to provide unlimited roaming service to the subscriber based on a plurality of factors, including the attribute value, such as the unlimited roaming service identifier, that indicates whether unlimited roaming service is permitted on the roaming partner switch and the value of the origination indicator received from the HLR. If the subscriber is eligible to receive unlimited roaming service on the roaming partner switch, the billing system can be configured to treat the subscriber as an unlimited roaming subscriber (440). For example, the billing system can generate an entry corresponding to the subscriber in a database, indicating that the subscriber is to receive unlimited roaming service. Thus, the subscriber's customer experience on the roaming partner switch will approximate the customer experience in a home service area. The subscriber, e.g., can be permitted to access provider-sponsored directory assistance and utilize provider-based services, such as account management and customer service. Further, announcements and messages typically presented to a subscriber accessing service in a roaming area can be suppressed in an unlimited roaming area. Verification measures implemented to authorize service in roaming areas, such as account balance inquiries, also can be suspended. The presentation of one or more roaming indicators, such as a visual indicator displayed on the screen of a mobile device, also can be turned off in an unlimited roaming area. Additionally, the subscriber will be billed as though service was being accessed in a home service area. In some implementations, unlimited service can be limited to voice service. In some other implementations, unlimited service can include voice service, text service, data service, or any combination thereof.

If the subscriber is not eligible to receive unlimited roaming service on the roaming partner switch, for any reason, the billing system can be configured to treat the subscriber as a standard roaming subscriber (445). For example, the billing system can generate an entry corresponding to the subscriber in a database, indicating that the subscriber is to receive standard roaming service. Thus, the roaming subscriber can be billed air time charges for every incoming and outgoing call routed through the roaming partner switch. Further, services and tools provided in home service areas, such as directory assistance and account management, can be blocked during standard roaming.

Additionally, the billing system can generate and transmit a response to the roaming partner switch (450). The response indicates to the roaming partner switch how call events originated by the roaming subscriber are to be managed. Because the distinction between roaming subscribers registered as home and roaming subscribers registered as roam is managed by the billing system, the same response can be sent to the roaming partner switch for both types of registration. For example, the billing system can respond to the roaming partner switch with a message that specifies an origination indicator equal to 6 and has the origination request trigger armed for all roaming registrations.

Figure 5:
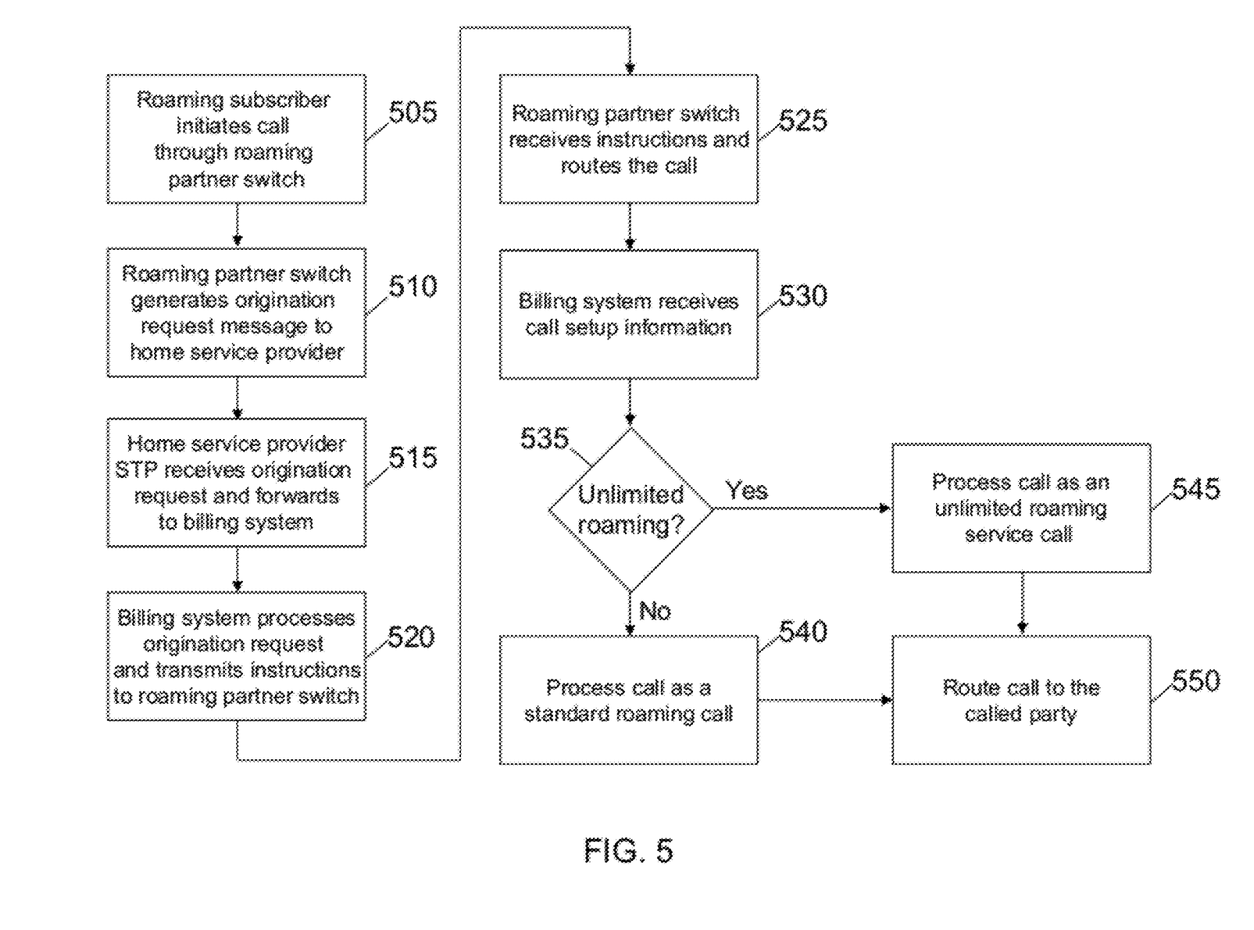
FIG. 5 shows an exemplary flowchart for a call event initiated by a roaming subscriber.

FIG. 5 shows an exemplary flowchart for a call event initiated by a roaming subscriber. A roaming subscriber can initiate a telephone call from a mobile device through a roaming partner switch (505). For example, the mobile device can transmit a dialed telephone number to the roaming partner switch. In response to receiving the dialed telephone number, the roaming partner switch can generate an origination request message to the subscriber's home wireless service provider (510). For example, the roaming partner switch can access its VLR, which identifies the home service provider HLR to which the origination request message is to be sent. The origination request message can include the subscriber's mobile number (MDN) and the dialed telephone number indicating the called party. Once generated, the roaming partner switch can transmit the origination request message to the home service provider HLR. For example, the origination request message can be addressed to the HLR point code of the home service provider.

The home service provider STP can receive the origination request message and forward the message to the billing system (515). For example, the STP can access the addressing information corresponding to the origination request message to identify its source. Upon determining that the message was received from a roaming partner switch, the STP can redirect the origination request message to the billing system based on predetermined routing rules. The billing system can retrieve the dialed telephone number from the origination request message and store the number, such as in a database entry associated with the subscriber. For example, the billing system can store the MDN included in the origination request message in combination with the MIN of the mobile device initiating the telephone call.

Further, the billing system can process the origination request message and transmit instructions to the roaming partner switch (520). For example, the billing system can generate a reply to the origination request instructing the roaming partner switch to route the call to a number other than the dialed telephone number, such as a toll-free number associated with the home network. In some implementations, the substitute telephone number can be a single telephone number used to route all roaming calls placed by mobile subscribers. The roaming partner switch can use the instructions transmitted by the billing system to route the call to the substitute telephone number (525). The telephone call can be routed over the public switched telephone network (PSTN). Upon receiving the telephone call from the roaming partner switch, the home network can route the call setup information to the billing system (530).

The billing system evaluates the call to determine whether unlimited roaming service is to be provided to the roaming subscriber (535). For example, the billing system can retrieve a previously recorded database entry corresponding to the subscriber that indicates whether unlimited roaming service is to be provided. If unlimited roaming service is not to be provided, the call can be processed as a standard roaming call (540). The billing system can replace the toll-free number used by the roaming partner switch with the dialed telephone number. For example, the billing system can match the subscriber's MDN included with the call setup information to the MIN and MDN previously stored. The billing system also can prepare to route the call. For example, an announcement can be presented informing the subscriber that the call will be billed. The billing system also can perform one or more verification measures before authorizing the call, such as verifying that the subscriber's account balance is sufficient to connect the call. Further, during the call, the billing system can apply charges, such as air time and long distance charges, to the subscriber's account and can cut-off the call if the subscriber's account drops below a predetermined balance.

Alternatively, if unlimited roaming service is to be provided, the call can be processed as an unlimited roaming service call (545). The billing system can replace the toll-free number used by the roaming partner switch with the dialed telephone number, such as by matching the subscriber's MDN to the previously stored MIN and MDN. The billing system also can prepare to route the call. For example, the billing system can determine not to present a roaming announcement. The billing system also can forego any billing measures for the call. Additionally, the billing system can suspend both pre-connection verification measures and balance monitoring during the call. Once the billing system has processed the call, it can be routed to the called party (550). For example, the call can be routed through a Voice Over Internet Protocol (VoIP) switch associated with the home wireless service provider's home network.

Figure 6:
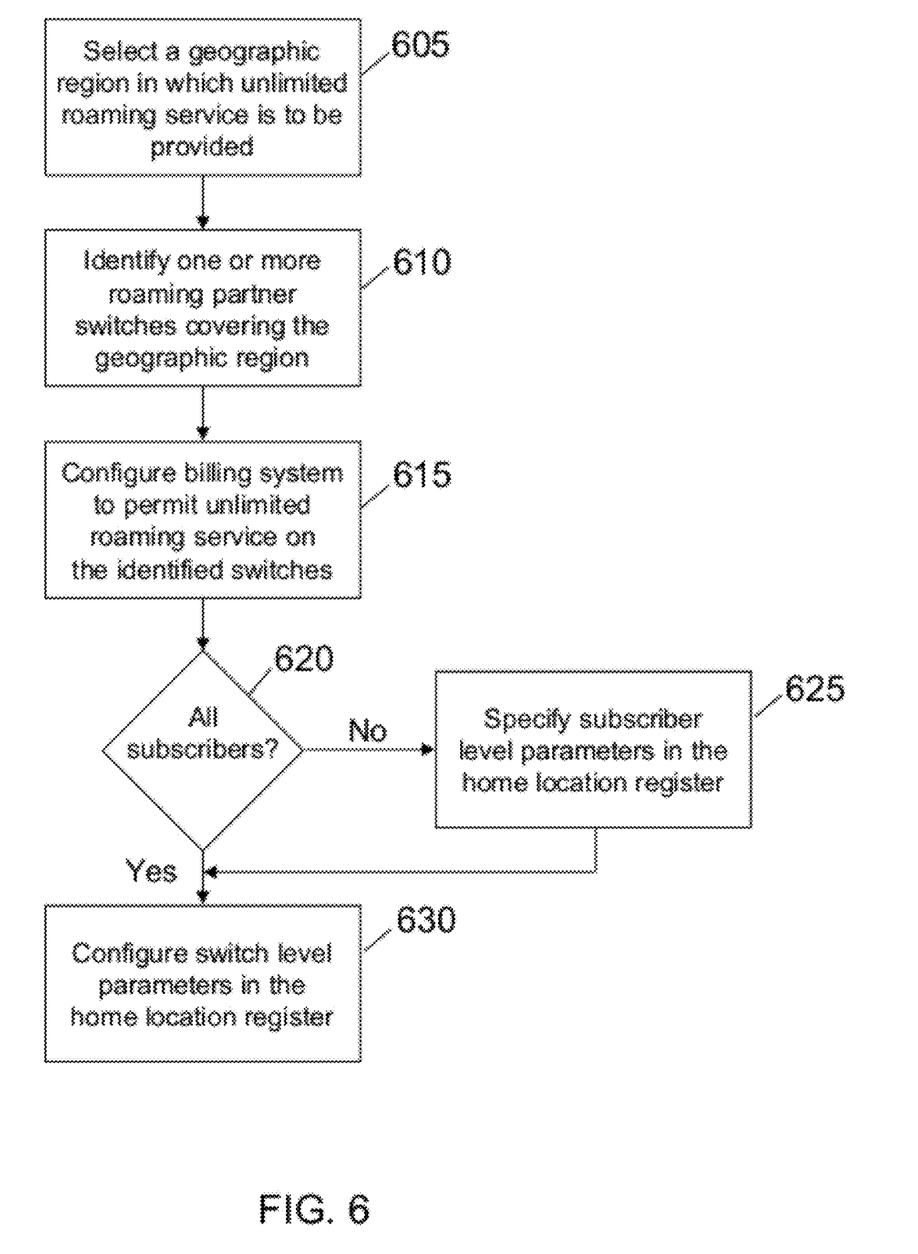
FIG. 6 shows an exemplary flowchart for configuring an unlimited roaming service area in a geographic region.

FIG. 6 shows an exemplary flowchart for configuring an unlimited roaming service area in a geographic region. The geographic region can be covered by one or more roaming service areas associated with one or more roaming partners of a home wireless service provider. In some implementations, the geographic region also can include one or more home service areas associated with the home wireless service provider. For example, the geographic region can be partially covered by home service areas and one or more unlimited roaming service areas can be configured to provide additional coverage areas or capacity.

Further, the unlimited service area can be made accessible to all subscribers or any subset of subscribers of the home wireless service provider. For example, the home wireless service provider can establish a virtual home service area in a particular geographic region by configuring a number of roaming partner switches in that region to provide unlimited roaming service. In some implementations, the virtual home service area can be used to expand the home wireless service provider's home network into a new geographic region, either indefinitely or for a limited period of time. Thus, subscribers whose home market corresponds to the virtual home service area can be provided with unlimited roaming service that provides the same customer experience and billing as an actual home service area. Further, a subscriber whose home market does not correspond to the virtual home service area can be treated as a standard roaming subscriber. In another example, a geographic region in which a special event occurs, such as a game or a convention, can be configured as an unlimited roaming service area for all subscribers during the period of the event. Thus, all subscribers of the home wireless service provider can be provided with unlimited roaming service in the geographic region corresponding to the event for the duration of the event, such as a day, a weekend, or a week.

A geographic region can be selected in which the unlimited roaming service is to be provided (605). The home wireless service provider can determine the geographic region in which the unlimited roaming service area is to be established. For example, if a virtual home service area is being configured to provide the home wireless service provider with a home network presence in a city, a geographic region that generally corresponds to the city boundaries can be selected. The geographic region can have any shape and dimensions. Further, one or more roaming partner switches covering the selected geographic region can be identified (610). The one or more roaming partner switches can be identified based on their coverage areas within the selected geographic region. Also, the identified switches can be associated with one or more roaming partners. For example, if Boulder, Colo. is selected as the geographic region, switches associated with one or more roaming partners can be identified to provide full coverage within the Boulder region.

The billing system can be configured to permit unlimited roaming service on the identified roaming partner switches (615). For example, the billing system can access a database hosting information about a plurality of switches, including roaming partner switches, to determine whether unlimited roaming service can be provided on a particular roaming partner switch. Each switch can be described by a unique switch identifier, such as an MSCID. If an identified roaming partner switch is not already configured to permit unlimited roaming service, a corresponding attribute value can be set to authorize unlimited roaming service on that switch. In some implementations, if the selected roaming partner switch is not technically compatible with the provision of unlimited roaming service, the attribute value can be locked to prevent change.

Further, the home wireless service provider can determine whether all subscribers should be given access to the unlimited roaming service (620). For example, it can be determined that all subscribers are to be given unlimited roaming service on a roaming partner switch for an event. However, it can be determined that only certain subscribers are to be given unlimited roaming service in a virtual home service area. If all subscribers are not to be given access to the unlimited roaming service, one or more subscriber level parameters can be specified on the HLR (625). Thus, the HLR can be configured to base the home or roam registration determination, at least in part, on one or more subscriber level parameters. For example, the HLR can be configured to evaluate any information associated with a subscriber, including the subscriber's home region parameter, service plan, and billing plan. If a subscriber level parameter does not match the criteria for a home registration, the subscriber can be registered by the HLR as roaming (or roam).

One or more switch level parameters can be configured on the HLR if all subscribers are to be given access to the unlimited roaming service or in addition to specifying subscriber level parameters (630). The switch level parameters can include a home region parameter setting associated with each identified roaming partner switch. For example, a MDF can include one or more home region parameters that are allocated as home regions for the roaming partner switch. A home region parameter in the MDF can be modified to indicate that subscribers of the home wireless service provider who are roaming on that roaming partner switch are to be registered as home users and thus provided with unlimited roaming service for the duration of the registration. In some implementations, one or more other switch level parameters also can be configured on the HLR.

In some implementations, the configuration changes to the billing system and HLR can be made in real-time. Thus, unlimited roaming service can be turned on or off with respect to a roaming partner switch in the time required to configure the billing system and the HLR. In some other implementations, date and time parameters associated with turning the unlimited roaming service on and/or off also can be specified. Thus, the configuration changes associated with unlimited roaming service for a roaming partner switch can be automatically implemented at the specified time.

Figure 7:
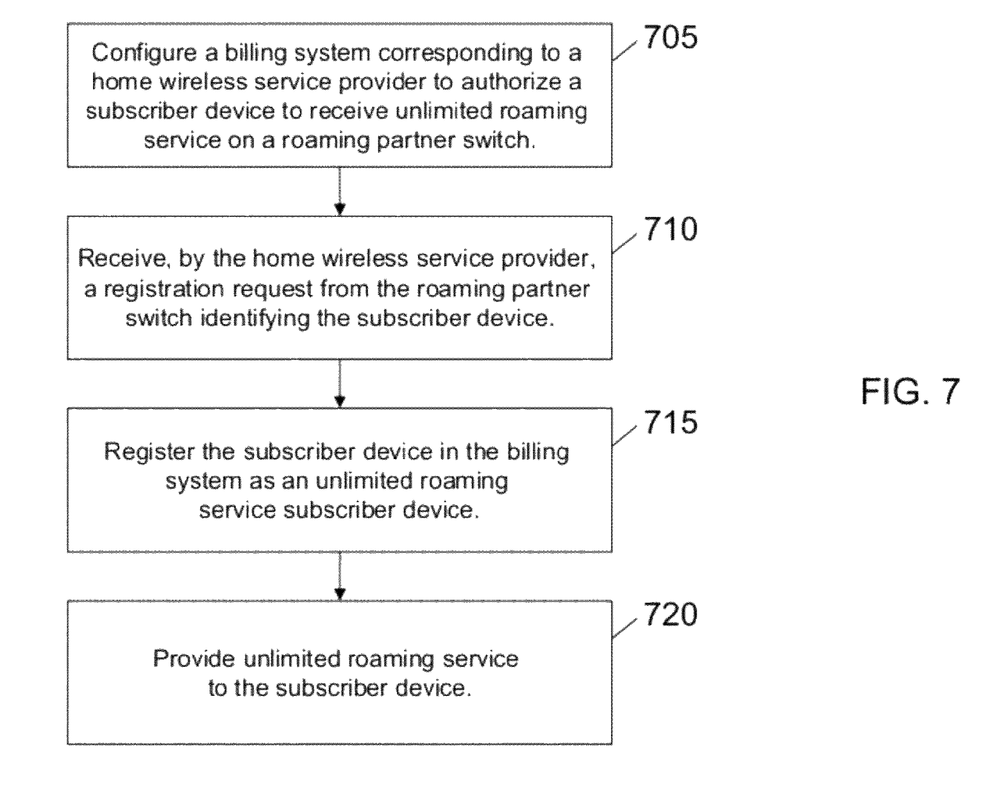
FIG. 7 shows an exemplary flowchart for a method of enabling unlimited roaming service on a roaming partner switch.

FIG. 7 shows an exemplary flowchart for a method of enabling unlimited roaming service on a roaming partner switch. A billing system corresponding to a home wireless service provider can be configured to authorize a subscriber device to receive unlimited roaming service on a roaming partner switch (705). A registration request identifying the subscriber device can be received by the home wireless service provider from the roaming partner switch (710). The subscriber device can be registered in the billing system as an unlimited roaming service subscriber device (715). Once the subscriber device has been registered in the billing system, unlimited roaming service can be provided to the subscriber device (720).

The techniques and functional operations described in this disclosure can be implemented in digital electronic circuitry, or in computer software, firmware, or hardware, including the structural means described in this disclosure and structural equivalents thereof, or in combinations of them. The techniques can be implemented using one or more computer program products, e.g., machine-readable instructions tangibly stored on computer-readable media, for execution by, or to control the operation of one or more programmable processors or computers.

The processes and logic flows described in this disclosure can be performed by one or more programmable processors executing one or more instructions to receive, manipulate, and/or output data. The processes and logic flows also can be performed by programmable logic circuitry, including one or more FPGAs (field programmable gate array), PLDs (programmable logic devices), and/or ASICs (application-specific integrated circuit). General and/or special purpose processors, including processors of any kind of digital computer, can be used to execute computer programs and other programmed instructions stored in computer-readable media, including nonvolatile memory, such as read-only memory, volatile memory, such as random access memory, or both. Additionally, data and computer programs can be received from and transferred to one or more mass storage devices, including hard drives, flash drives, and optical storage devices. Further, general and special purpose computing devices and storage devices can be interconnected through communications networks.

A number of implementations have been disclosed herein. Nevertheless, it will be understood that various modifications may be made without departing from the spirit and scope of the claims. Accordingly, other implementations are within the scope of the following claims.

What is claimed is:

1. A method of enabling unlimited roaming service on a roaming partner switch, the method comprising:
    configuring a billing system corresponding to a home wireless service provider to authorize a subscriber device to receive unlimited roaming service on a roaming partner switch, wherein the subscriber device is associated with the roaming partner switch as a home subscriber device based on authorization of the unlimited roaming service;
    receiving, by the home wireless service provider, a registration request from the roaming partner switch identifying the subscriber device;
    registering the subscriber device in the billing system as an unlimited roaming service subscriber device; and
    enabling receipt of the unlimited roaming service to the subscriber device on the roaming partner switch, wherein a user associated with the subscriber device is not required to have an account with the roaming partner in order to receive the unlimited roaming service.

2. The method of claim 1, further comprising:
    registering the subscriber device as a home subscriber device in a home location register associated with the home wireless service provider.

3. The method of claim 2, wherein registering the subscriber device as a home subscriber device further comprises:
    determining that a home region parameter associated with the subscriber device corresponds to a geographic location of the roaming partner switch.

4. The method of claim 2, further comprising:
    notifying the billing system, by the home location register, that the subscriber device has been registered as a home subscriber device.

5. The method of claim 1, further comprising:
    receiving from the roaming partner switch a call request associated with the subscriber device; and
    suspending billing associated with the call request.

6. The method of claim 5, wherein suspending billing further comprises suppressing a pre-call announcement associated with standard roaming service.

7. The method of claim 5, wherein suspending billing further comprises suspending an account balance verification.

8. The method of claim 1, further comprising:
    receiving a registration request from the roaming partner switch identifying a second subscriber device associated with the home wireless service provider;
    determining, based on the billing system configuration, that the second subscriber device is not authorized to receive unlimited roaming service on the roaming partner switch; and
    providing standard roaming service to the second subscriber device.

9. The method of claim 1, wherein registering the subscriber device in the billing system is performed in real-time.

10. The method of claim 1, further comprising:
    restricting the unlimited roaming service provided to the subscriber device to a subscribed level of service.

11. The method of claim 10, wherein the subscribed level of service includes unlimited voice service.

12. A system comprising:
    a home wireless service provider that includes a billing system and a home location register;
    a roaming partner switch communicatively coupled to the home wireless service provider; and
    a subscriber device associated with the home wireless service provider;

wherein the home wireless service provider includes processor electronics configured to perform operations comprising:

authorizing, in the billing system, the subscriber device to receive unlimited roaming service on the roaming partner switch, wherein the subscriber device is associated with the roaming partner switch as a home subscriber device based on authorization of the unlimited roaming service;

registering, in response to receiving a registration request identifying the subscriber device from the roaming partner switch, the subscriber device in the home location register as a home subscriber device and in the billing system as an unlimited roaming service subscriber device; and enabling the provision of unlimited roaming service to the subscriber device on the roaming partner switch, wherein a user associated with the subscriber device is not required to have an account with the roaming partner in order to receive the unlimited roaming service.

13. The system of claim 12, wherein the home location register is configured to perform operations comprising:

determining that a home region parameter associated with the subscriber device corresponds to a geographic location of the roaming partner switch.

14. The system of claim 12, wherein the home location register is configured to perform operations comprising:

transmitting a message to the billing system, indicating that the subscriber device has been registered as a home subscriber device.

15. The system of claim 12, wherein the processor electronics are further configured to perform operations comprising:

receiving from the roaming partner switch a call request associated with the subscriber device; and suspending billing associated with the call request.

16. The system of claim 15, wherein the processor electronics are further configured to perform operations comprising:

suppressing a pre-call announcement associated with standard roaming service.

17. The system of claim 15, wherein the processor electronics are further configured to perform operations comprising:

suspending an account balance verification.

18. The system of claim 12, wherein the processor electronics are further configured to perform operations comprising:

receiving a registration request from the roaming partner switch identifying a second subscriber device associated with the home wireless service provider; determining, based on the billing system configuration, that the second subscriber device is not authorized to receive unlimited roaming service on the roaming partner switch; and providing standard roaming service to the second subscriber device.

19. The system of claim 12, wherein the processor electronics are further configured to perform operations comprising:

registering the subscriber device in the billing system in real-time.

20. The system of claim 12, wherein the processor electronics are further configured to perform operations comprising:

restricting the unlimited roaming service enabled for the subscriber device to a subscribed level of service.

21. The system of claim 20, wherein the subscribed level of service includes unlimited voice service.

22. A method of enabling unlimited roaming service on a roaming partner switch, the method comprising:

receiving, by a home wireless service provider, a registration request from a roaming partner switch identifying a subscriber device;

registering, by a home location register associated with the home wireless service provider, the subscriber device as a home subscriber device based on one or more subscriber values;

determining, by a billing system associated with the home wireless service provider, that the subscriber device is eligible to receive unlimited roaming service based at least in part on the subscriber device being registered as a home subscriber device, wherein the subscriber device is associated with the roaming partner switch as a home subscriber device based on authorization of the unlimited roaming service; and providing unlimited roaming service to the subscriber device on the roaming partner switch, wherein a user associated with the subscriber device is not required to have an account with the roaming partner in order to receive the unlimited roaming service.

* * * * *